United States Patent

Hoggar

[15] 3,668,656

[45] June 6, 1972

[54] MEMORY CELLS

[72] Inventor: Clive William Hoggar, Chelmsford, England

[73] Assignee: The Marconi Company, Limited, London, England

[22] Filed: Aug. 14, 1970

[21] Appl. No.: 63,679

[30] Foreign Application Priority Data

Aug. 18, 1969 Great Britain....................41,076/69

[52] U.S. Cl...........................340/173 FF, 307/289, 307/291

[51] Int. Cl.....................................G11c 11/40, H03k 3/286

[58] Field of Search.............340/173 FF; 307/238, 291, 289

[56] References Cited

UNITED STATES PATENTS

| | | | |
|---|---|---|---|
| 3,292,008 | 12/1966 | Rapp | 340/173 |
| 3,309,534 | 3/1967 | Yu | 340/173 |

*Primary Examiner*—Terrell W. Fears
*Attorney*—Baldwin, Wight & Brown

[57] ABSTRACT

An electronic memory cell consists of a bistable circuit and three access paths. Two of the access paths are used to control the state of the bistable, one of these paths being used to set the bistable, to one of its two stable states and the other of these access paths to set the bistable to the other stable state. A low impedance path is provided between one of these two access paths and the third access path in dependence on the state of the bistable to permit read-out of the memory cell.

12 Claims, 2 Drawing Figures

FIG. 1

Figure 1:
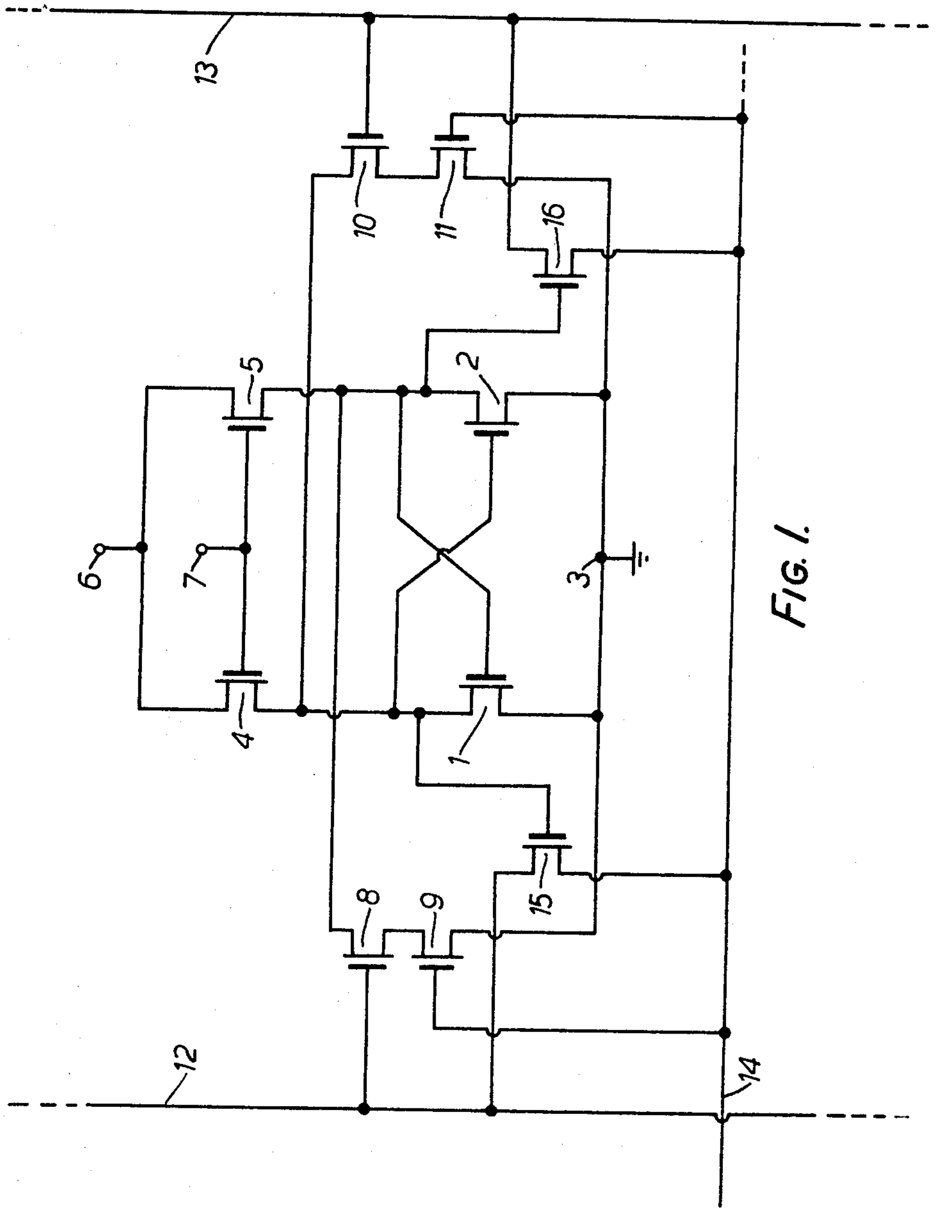

INVENTOR
Clive William Hoggar
BY
Baldwin Wight & Brown
ATTORNEYS

INVENTOR
Clive William Hoggar
BY
Baldwin Wight & Brown
ATTORNEYS

MEMORY CELLS

This invention relates to memory cells and memory cell arrangements and seeks to provide improved such cells and arrangements.

According to this invention a memory cell comprises a bistable circuit, first, second and third signal access paths, the first and second of said paths being arranged to switch said bistable circuit to one or other of its stable states to store a "1" or a "0" as the case may be, and two selectably low impedance paths, one connected between said first and said third paths and one connected between said second and said third paths, said selectably low impedance paths being arranged to be controlled by the state of said bistable circuit so that in one of its states one of said paths is of low impedance and the other of high impedance while in the other of its states the other of said paths is of low impedance and the one is of high impedance.

Preferably said bistable circuit comprises two active elements cross-coupled as known per se, two further selectably low impedance paths being provided, one across each active element whereby said bistable circuit may be set to one state by selecting one of said two further selectably low impedance paths to be of low impedance and the other of high, and vice versa.

Preferably said bistable circuit comprises two p. type M.O.S. transistors, the gate electrode of one being connected to the drain electrode of the other, and vice versa, one of said two further selectably low impedance paths being connected between the drain and source electrodes of each transistor.

Preferably again, said first mentioned two selectably low impedance paths each comprises a M.O.S. transistor, one having its drain electrode connected to said first signal access path, its source electrode connected to said third signal access path and its gate electrode connected to one of the active elements comprising the bistable circuit and the other having its drain electrode connected to said second signal access path, its source electrode connected to said third signal access path and its gate electrode connected to the other of the active elements comprising the bistable circuit. Where the active elements comprising the bistable circuit are M.O.S. transistors the gate electrodes of the M.O.S. transistors comprising said first mentioned two selectably low impedance paths are connected to the appropriate drain electrodes of the M.O.S. transistors comprising the bistable circuit.

Preferably again, said further two selectably low impedance paths each comprises two M.O.S. transistors connected with their source/drain paths in series across one of the active elements comprising the bistable circuit, one of the serially connected two transistors having its gate electrode connected to the third signal access path and the other having its gate electrode connected to an appropriate one of the first and second signal access paths.

An associative memory store in accordance with this invention comprises an array of memory cells as above described connected with common first, second and third signal access paths.

Figure 2:
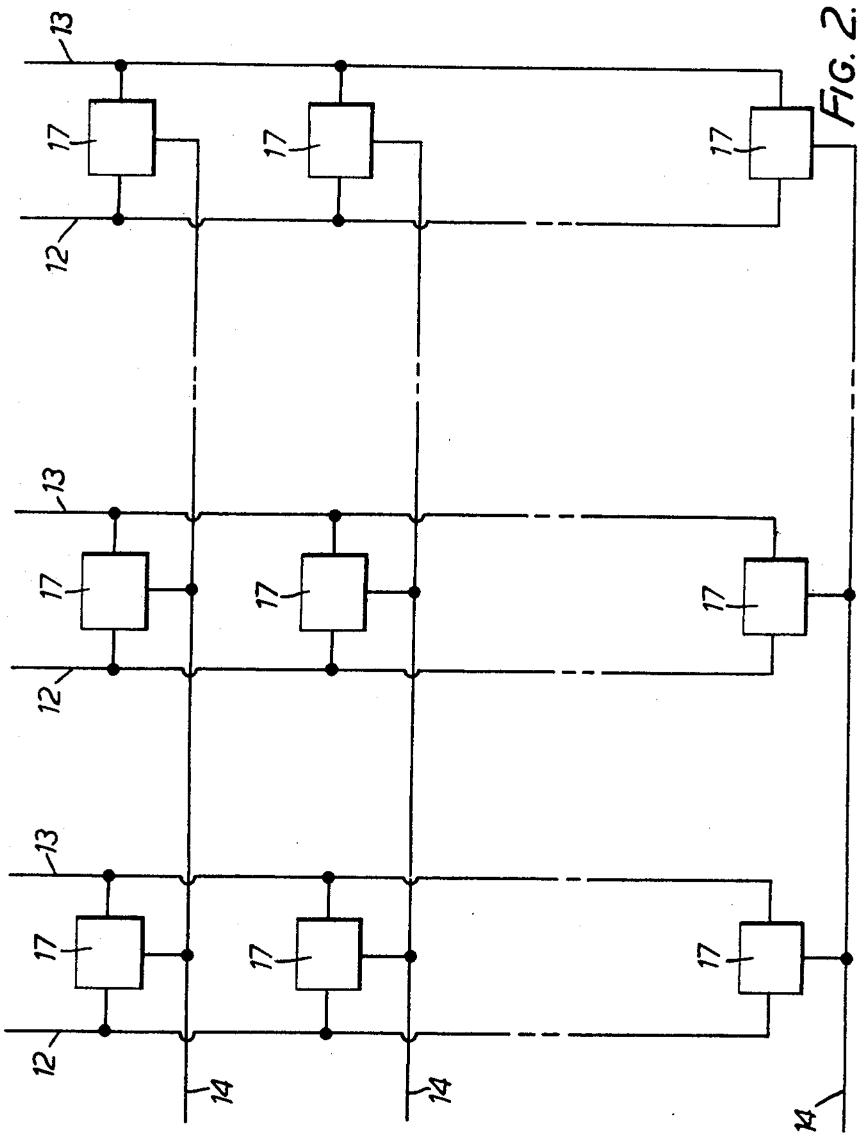

The invention is illustrated in and further described with reference to the accompanying drawings in which FIG. 1 is a circuit diagram of a single memory cell in accordance with the present invention and FIG. 2 is a block schematic diagram of a plurality of single memory cells interconnected to form an associative memory store.

Referring to FIG. 1, two M.O.S. transistors 1 and 2 of the p-channel type are arranged each with its gate electrode connected to the drain electrode of the other to form a bistable circuit. The source electrodes of transistors 1 and 2 are connected together and to earth at 3.

Two further M.O.S. transistors, 4 and 5, again of the p-channel type, are connected to provide the drain loads of transistors 1 and 2. The drain electrodes of transistors 4 and 5 are connected together and to a terminal 6 to which potential from a reference source (not shown) is applied. Terminal 6 is maintained at 20 volts negative with respect to earth 3. Transistors 4 and 5 act merely as passive circuit elements. The gate electrodes of transistors 4 and 5 are connected together and to a terminal 7 to which gate bias potential is applied from a source (not shown) such that the drain-to-source resistance of each of transistors 4 and 5 is of the order of 100 KΩ.

Across the source-drain path of transistor 2 are connected two further M.O.S. transistors, 8 and 9, again of the p-channel type, in series. The drain electrode of transistor 8 is connected to the drain electrode of transistor 2 while the source electrode of transistor 8 is connected to the drain electrode of transistor 9. The source electrode of transistor 9 is connected to earth 3.

Across the source-drain path of transistor 1 are connected two further M.O.S. transistors, 10 and 11, again of the p-channel type. The drain electrode of transistor 10 is connected to the drain electrode of transistor 1 while the source electrode of transistor 10 is connected to the drain electrode of transistor 11. The source electrode of transistor 11 is connected to earth 3.

Transistors 8 and 9, when conductive, thus connect the drain electrode of transistor 2 to earth 3 while transistors 10 and 11, when conductive, connect the drain electrode of transistor 1 to earth 3 thereby to trigger the bistable circuit formed by transistors 8 and 9 from its one state to its other, and vice versa.

The gate of transistor 8 is connected to a first access signal path 12 to which, in operation, "0" digits to be stored are applied. The gate of transistor 10 is connected to a second signal access path 13 to which, in operation, "1" digits to be stored are applied.

The gates of transistors 9 and 11 are both connected to a third access signal path 14 to which, in operation, read-out signals are applied when a digit stored in the cell is to be read out. The cell is completed by two further M.O.S. transistors, 15 and 16, again of the p-type. Transistor 15 has its gate electrode connected to the drain electrode of transistor 1, its source electrode connected to third signal access path 14 and its drain electrode connected to first signal access path 12. Transistor 16 has its gate electrode connected to the drain electrode of transistor 2, its source electrode connected to the third signal access path 14 and its drain electrode connected to second signal access path 13.

The operation of the single cell shown in FIG. 1 will now be described. In the quiescent state with no signal present of any of the signal access paths 12, 13 or 14, the cell may contain either a "0" or a "1." The "0" state is that state in which transistor 1 is OFF (i.e. the drain-to-source path of the transistor is high) and transistor 2 is ON (i.e. the drain-to-source path of the transistor is low). The "1" state is that state in which transistor 1 is ON and transistor 2 is OFF.

Signal access paths 12, 13 and 14 are normally held at the reference potential at 3, i.e. earth potential.

To write a "1" into the memory cell shown in FIG. 1 signal access paths 13 and 14 are simultaneously pulsed to −20 volts. Since the M.O.S. transistors are of p-channel type the negative going pulses on the gate electrodes of transistors 10 and 11 turn these transistors ON, and consequently the voltage on the drain electrode of transistor 10 closely approaches the reference potential (i.e. earth) at 3. The voltage at the gate electrode of transistor 2, which is the same as that at the drain electrode of transistor 10, turns transistor 2 OFF. The drain electrode of transistor 2 consequently approaches the voltage of terminal 6 and this negative voltage is applied to the gate electrode of transistor 1, which thus turns ON so that the voltage at the drain electrode of transistor 1 more closely approaches the reference potential at 3. The change in voltage at the gate electrode of transistor 2 is therefore cumulative and the bistable circuit rapidly assumes the stable state in which transistor 2 is fully OFF and transistor 1 is fully ON. In this condition the memory cell stores a "1."

A "0" may be subsequently written into the memory cell by pulsing signal access paths 12 and 14 simultaneously to −20 volts, which turns transistors 8 and 9 ON and thereby provides a low impedance path in parallel with the transistor 2. The gate electrode voltage at transistor 1 is thereby caused closely to approach the reference potential at 3, causing transistor 1 to turn OFF which takes the gate electrode voltage of transistor 2 negative thereby turning transistor 2 ON. As before this action is cumulative and the stable state is rapidly reached in which transistor 1 is fully OFF and transistor 2 is fully ON. In this connection the memory cell stores a "0."

So far as reading-out the signal stored in the cell is concerned, the operation is as follows. If the signal stored in the cell is a "1," transistor 1 is ON and transistor 2 is OFF as previously defined. In this state the gate voltage of transistor 16 is negative and this transistor is therefore in the ON state which provides a low impedance path from the signal access path 14 to the signal access path 13. To read the contents of the memory cell the signal access path 14 is pulsed to −2 volts with respect to the reference potential at 3. Accordingly, if a "1" is present in the memory cell the voltage pulse applied to signal access path 14 causes current to flow in the signal access path 13, which may be detected by a current detector (not shown) connected thereto. The state of the memory cell remains unchanged since at this time transistor 10 is in the OFF state. Similarly, if instead of containing a "1" the memory cell had contained a "0" the current pulse applied to signal access path 14 would have passed through transistor 15 to signal access path 12 and have been detected by a current detector (not shown) connected to that signal access path.

It is also possible to operate the cell in what is known as a search mode. To search for a "1" in the memory cell the signal access path 12 is pulsed to −2 volts. If the cell contains a "0" then, as previously stated, transistor 1 is OFF and transistor 2 is ON, and hence as transistor 15 is ON a low impedance path is provided between signal access path 12 and signal access path 14. The −2 volt pulse applied to the signal access path 12 causes a current pulse to flow in signal access path 14. This effect is termed a mismatch condition, and may be detected by a current detector (not shown) connected to signal access path 14. If however the memory cell does contain a "1" the transistor 15 will be OFF and a high impedance path is presented between signal access path 12 and signal access path 14 and accordingly no current flows in signal access path 14 and no signal is detected by the detector connected thereto.

Similarly, to search for a "0" the signal access path 13 is pulsed to −2 volts, and if the memory cell contains a "1" a signal is obtained on signal access path 14 which may be detected, or if the memory cell does contain a "0" no signal is detected by the detector connected to signal access path 14.

Referring to FIG. 2, the associative memory consists of an array of individual memory cells 17 each of which is a shown in FIG. 1. The signal access paths 14 of each memory cell are common to all bits in a word, and the signal access paths 12 and 13 are common to all corresponding bits in the memory array. In the search mode previously described the current detector (not shown) connected to signal access path 14 provides an OR function which detects the presence of one or more mismatch currents from one or more digits in a word.

I claim:

1. A memory cell comprising a bistable circuit, first, second and third signal access paths, two selectably low impedance paths, and two further selectably low impedance paths; one of said selectably low impedance paths being connected between said first and said third signal access paths and the other being connected between said second and said third signal access paths, one state of the bistable circuit setting one of said selectably low impedance paths to be of low impedance and the other to be of high impedance and the other state of the bistable circuit setting the other of said selectably low impedance paths to be of low impedance and the one to be of high impedance; said bistable circuit comprising two cross-coupled active elements, one of said two further selectably low impedance paths being connected across each active element, the bistable circuit being set to one state to store a "1" by selection of one of said two further selectably low impedance paths to be of low impedance in dependence on the state of said first and said third signal access paths and to the other state to store a "0" by selection of the other of said two further selectably low impedance paths to be of low impedance in dependence on the state of said second and said third signal access paths.

2. A memory cell as claimed in claim 1 and wherein said bistable circuit comprises two p-type M.O.S. transistors, the gate electrode of one being connected to the drain electrode of the other, and the gate electrode of the other being connected to the drain electrode of the one, one of said two further selectably low impedance paths being connected between the drain and source electrodes of each transistor.

3. A memory cell as claimed in claim 1 and wherein said first mentioned two selectably low impedance paths each comprises a M.O.S. transistor, one having its drain electrode connected to said first signal access path, its source electrode connected to said third signal access path and its gate electrode connected to one of the active elements in the bistable circuit and the other having its drain electrode connected to said second signal access path, its source connected to said third signal access path and its gate electrode connected to the other of the active elements in the bistable circuit.

4. A memory cell as claimed in claim 3 and wherein the active elements forming the bistable circuit are M.O.S. transistors and the gate electrodes of the M.O.S. transistors forming said first mentioned two selectably low impedance paths are connected to the appropriate drain electrodes of the M.O.S. transistors forming the bistable circuit.

5. A memory cell as claimed in claim 1 and wherein said two further selectably low impedance paths each comprises two M.O.S. transistors connected with their source/drain paths in series across one of the active elements forming the bistable circuit, one of the serially connected two transistors having its gate electrode connected to the third signal access path and the other having its gate electrode connected to an appropriate one of the first and second signal access paths.

6. An associative memory store comprising an array of memory cells as claimed in claim 5 connected with common first, second, and third signal access paths.

7. A memory cell comprising, in combination:

a bistable circuit comprising a pair of cross-coupled active elements having two output terminals, one for each stable state;

first, second and third signal access path means for writing in and reading out with respect to said bistable circuit;

first impedance means connected across one of said active elements for producing one stable state output at one of said output terminals, said first impedance means being connected to said first and said second signal access path means for producing such one stable state output in response to write-in signals applied simultaneously at said first and said second signal access path means;

second impedance means connected across the other of said active elements for producing the other stable state output at the other of said output terminals, said second impedance means being connected to said second and said third signal access path means for producing such other stable state output in response to write-in signals applied simultaneously at said second and third signal access path means;

third impedance means for providing a low impedance path between said first and said second signal access path means in response to the presence of said other stable state output, and fourth impedance means for providing a low impedance path between said third and said second signal access path means in response to the presence of said one stable state output.

8. A memory cell comprising, in combination:

a bistable circuit having two stable state outputs;

first, second and third signal access path means for controlling said bistable circuit to effect storage therein and for determining the storage condition of said bistable circuit without altering its stable state;

first means connected to aid first and second signal access path means for effecting one stable state of said bistable circuit in response to write-in signals applied simultaneously to said first and said second signal access path means and for effecting a low impedance path between said first and said second signal access path means only in response to attainment of said one stable state; and second means connected to said second and said third signal access path means for effecting the other stable state of said bistable circuit in response to write-in signals applied simultaneously to said second and said third signal access path means and for effecting a low impedance path between said second and said third signal access path means only in response to attainment of said other stable state.

9. A memory cell as defined in claim 7 wherein said first impedance means comprises a pair of transistors having controllable current conducting paths connected in series and having control electrodes connected respectively to said first and said second signal access path means, said second impedance means comprises a pair of transistors having controllable current conducting paths connected in series and having control electrodes connected respectively to said second and said third signal access path means, said third impedance means comprises a transistor having a controllable current conducting path connecting said first and said second signal access path means and having a control electrode connected to said other output terminal, and said fourth impedance means comprises a transistor having a controllable current conducting path connecting said second and said third signal access path means and having a control electrode connected to said one output terminal.

10. A memory cell as defined in claim 8 wherein said first means includes a pair of transistors having series connected controllable current paths for affecting the output state of said bistable circuit and control electrodes connected respectively to said first and said second signal access path means, and said second means includes a pair of transistors having series connected controllable current paths for affecting the output state of said bistable circuit and control electrodes connected respectively to said second and said third signal access path means.

11. A memory cell as defined in claim 10 wherein said first means also includes a further transistor having a controllable current conducting path connecting said first and said second signal access path means and a control electrode connected to said bistable circuit for current control in response to one output state thereof, and said second means also includes a further transistor having a controllable current conducting path connecting said second and said third signal access path means and a control electrode connected to said bistable circuit for current control in response to the other output state thereof.

12. A memory cell as defined in claim 8 wherein said first means includes a further transistor having a controllable current conducting path connecting said first and said second signal access path means and a control electrode connected to said bistable circuit for current control in response to one output state thereof, and said second means includes a further transistor having a controllable current conducting path connecting said second and said third signal access path means and a control electrode connected to said bistable circuit for current control in response to the other output state thereof.

* * * * *